G. A. PUEPPKE.
NUT CRACKING DEVICE.
APPLICATION FILED MAY 28, 1921.

1,400,099.

Patented Dec. 13, 1921.

WITNESSES

INVENTOR
G. A. Pueppke,
BY
ATTORNEYS

UNITED STATES PATENT OFFICE.

GOTTLIEB A. PUEPPKE, OF OSHKOSH, WISCONSIN.

NUT-CRACKING DEVICE.

1,400,099.

Specification of Letters Patent.   Patented Dec. 13, 1921.

Application filed May 28, 1921.   Serial No. 473,244.

*To all whom it may concern:*

Be it known that I, GOTTLIEB A. PUEPPKE, a citizen of the United States, and a resident of Oshkosh, in the county of Winnebago and State of Wisconsin, have invented certain new and useful Improvements in Nut-Cracking Devices, of which the following is a specification.

This invention relates to a nut cracking device.

The object of my invention is to provide a device of the above character which is adapted for use in cracking pecans or other nuts of a similar shape.

An important object of the invention is that the nut cracker be adapted to crack a pecan or similar nut in such a manner that the meat therein may be removed in an unbroken state.

Other objects will hereinafter appear.

The invention is illustrated by way of example in the accompanying drawings, in which.

Figure 1:
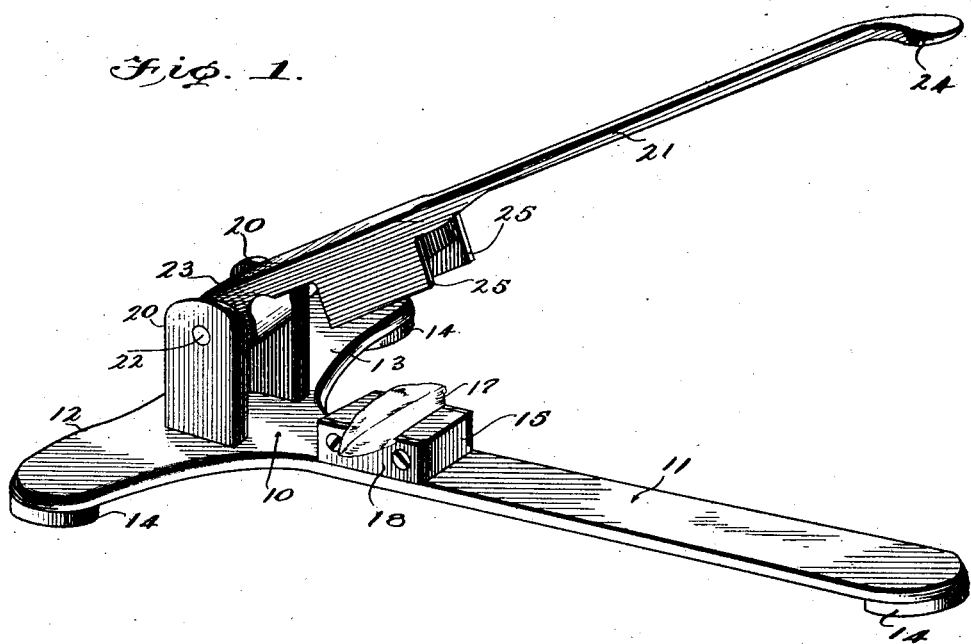
Figure 1 is a perspective view of a nut cracker embodying my invention.

Referring to the drawings more particularly, 10 indicates a base plate which is substantially T-shaped as shown, and the stem 11 thereof and head portions 12 and 13 each having formed at their outer end a supporting boss as indicated at 14.

Figure 2:
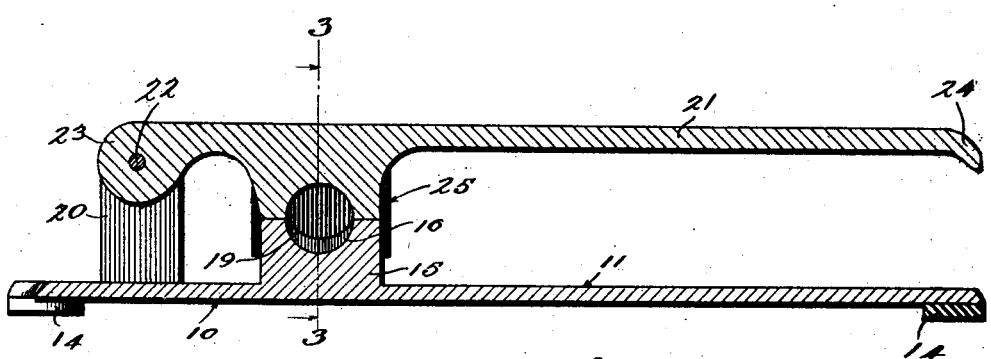
Fig. 2 is a longitudinal vertical section of the same.
Figure 3:
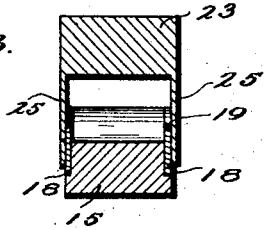
Fig. 3 is a sectional view taken substantially on the lines 3—3 of Fig. 2.

Upon the stem 11 near the head portion of the base plate, there is formed a block 15, and in the upper face of said block there is formed a semi-circular recess as indicated at 16, Fig. 2. The recess 16 extends the entire width of the block 15 and is adapted to receive a pecan as indicated at 17.

On each side of the block 15 there is secured a shearing blade 18, said shearing blades having their portions which register with the ends of the recess 16 formed in the shape of an arcuate curve as at 19, Fig. 2, and said curved portions being adapted to engage the ends of the nut 17 and normally support the same in spaced relation with the bottom of the recess 16.

Upon the head portion of the base plate 10 there is formed a pair of spaced posts 20, and between said posts there is pivoted the one end of a lever arm 21 by the means of a pin 22 which extends through the enlarged portion 23 of the lever arm 21 and has its ends suitably secured in the posts 20. The lever arm 21 is also formed at its outer end with an enlarged and downwardly curved flat portion 24 and near its inner end is formed with a pair of downwardly extending jaws or flanges 25, which are sufficiently spaced to accommodate the block 15 and shearing members 18 therebetween.

In the operation of the present device, a pecan is placed in the position as shown in Fig. 1. The lever 21 is then pressed down whereupon the jaws 25 will engage the ends of the pecan and coöperate with the shearing blades 18 for severing said ends of the pecan. After the ends of the pecan have been severed the same will drop into the recess 16 between the shearing blades 18 and further downward movement of the handle 21 will cause the bridge portion between the jaws 25 to engage the top of the pecan and crush or crack the same.

When this is completed the handle 21 may be raised and the pecan in its cracked state, removed. It has been found that by cracking the pecan in this manner that the meat thereof can be removed substantially unbroken or crushed.

I claim:—

1. A nut cracker of the class described, comprising in combination, a block recessed for receiving and supporting an elongated nut, a lever arm pivoted for vertical swinging movement and adapted to crack said nut when swung downwardly, and coöperating shearing jaw, means carried by said block and lever arm whereby the ends of the nut are severed therefrom previous to the cracking thereof.

2. A nut cracker of the class described, comprising in combination, a nut receiver and support, a pivoted lever arm adapted for operating over said receiver, and coöperating shearing means carried by said lever and nut receiver whereby with the downward movement of said lever arm the ends of the nut will be sheared therefrom.

3. A nut cracker of the class described, comprising in combination, a block having a recess adapted for receiving an elongated nut, a shearing blade at each end of said recess, a pivoted lever arm adapted to operate above said block, and a pair of jaws carried by said lever arm and adapted to sever the ends of said nut upon the downward movement of the said lever arm, and also adapted to crack said nut after the ends thereof have been severed.

4. A nut cracker of the class described, comprising a block having an arcuate recess extending across its upper face adapted for receiving an elongated nut, a shearing blade at each end of the recess, the edges of which are spaced above the bottom of said recess, a pivoted lever adapted for vertical swinging movement above said block, and a pair of jaws carried by said lever adapted to coöperate with the shearing blades carried by said block to sever the ends of a nut upon the downward movement of said lever.

5. A nut cracker of the class described, comprising a base, a block carried thereon, having a recess across its upper face adapted for receiving an elongated nut, a shearing blade secured to each side of the block and having a curved portion in alinement with the ends of the recess of said block, and said curved portion being spaced above the bottom of said recess, a lever pivoted forward to the block upon said base and adapted to be brought down upon said block, and a pair of jaws carried by said lever adapted to coöperate with the shearing blades to sever the ends of the nuts upon its downward movement, and also adapted to crack the nut after the ends thereof have been severed.

6. A nut cracker of the class described, comprising a nut receiver and support, a carrier movable relative to said receiver, and coöperating shearing means carried by said carrier and nut receiver whereby with the relative movement of said carrier and receiver the ends of the nut will be sheared therefrom in one operation.

7. A nut cracking device having laterally disposed spaced apart shearing means whereby to shear off the ends of a nut previous to cracking the same in one operation.

8. A nut cracking device having laterally disposed spaced apart shearing means whereby to shear off the ends of a nut in one operation.

GOTTLIEB A. PUEPPKE.